March 16, 1965
E. A. JONES ETAL
SOLVENT EXTRACTION PROCESS FOR RECOVERY
OF AROMATIC HYDROCARBONS
Filed June 17, 1960
3,173,966
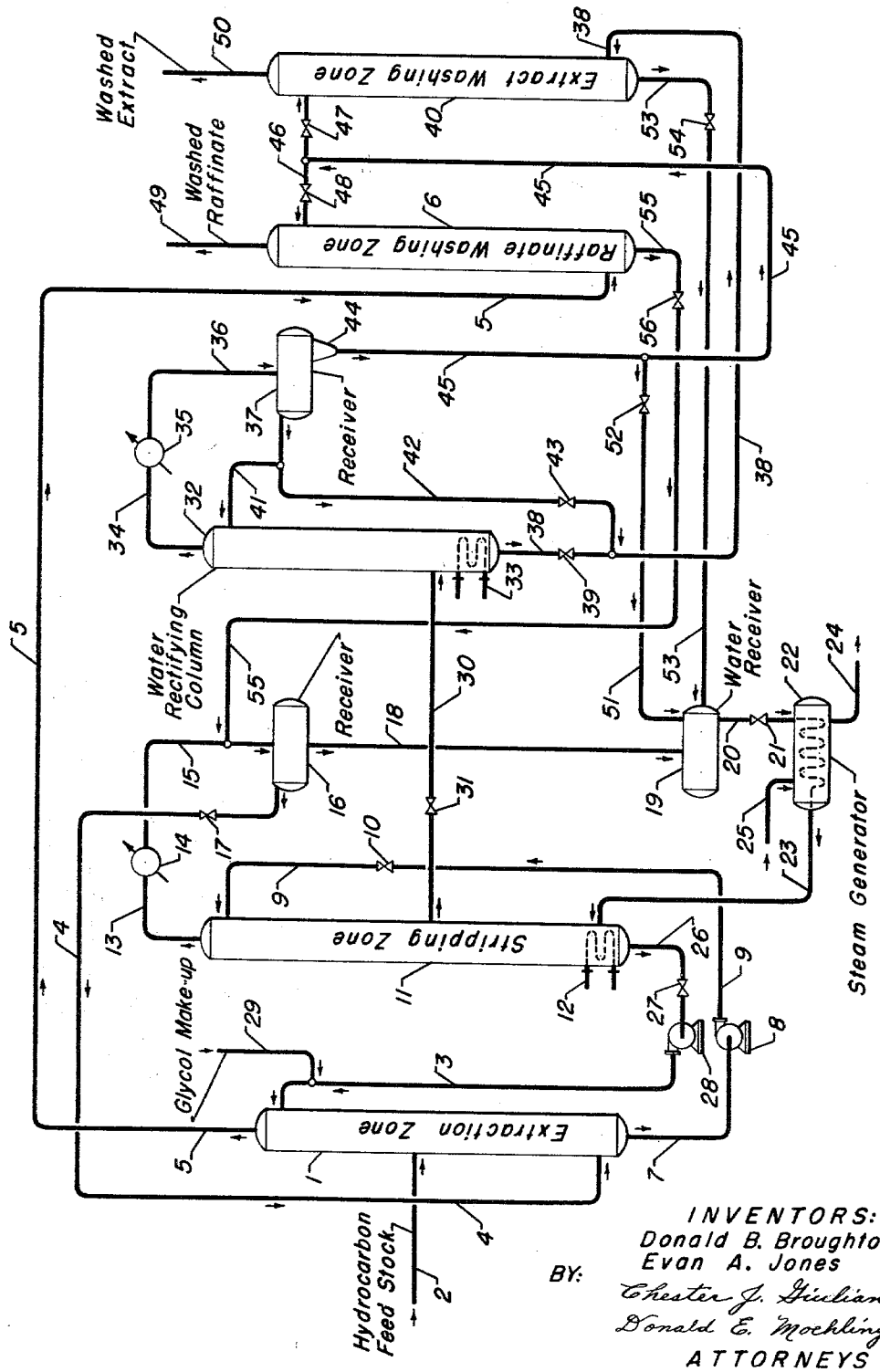
INVENTORS:
Donald B. Broughton
Evan A. Jones
BY: Chester J. Giuliani
Donald E. Moehling
ATTORNEYS

3,173,966
SOLVENT EXTRACTION PROCESS FOR RECOVERY OF AROMATIC HYDROCARBONS
Evan A. Jones, Skokie, and Donald B. Broughton, Chicago, Ill., assignors to Universal Oil Products Company, Des Plaines, Ill., a corporation of Delaware
Filed June 17, 1960, Ser. No. 36,911
8 Claims. (Cl. 260—674)

This invention relates to an improvement in solvent extraction processes for the recovery of aromatic hydrocarbons from hydrocarbon feed stocks utilizing a solvent composition containing water as one of its components and wherein the raffinate and extract streams are washed with water to remove dissolved solvent, said improvement relating to the rectification of the side-cut vapors separated from the rich solvent stripping stage of the process whereby a substantially solvent-free water distillate is recovered which is thereafter utilized as the source of solvent-free water for washing the raffinate and extract products recovered from the process.

One object of this invention is to provide a solvent extraction process for the recovery of substantially pure, solvent-free aromatic extract and paraffinic raffinate hydrocarbon products from a mixed hydrocarbon feed stock. Another object of this invention is to provide a simplified, more economical means of recovering solvent-free water from the extract-vapor side-cut of the stripping column involved in the solvent extraction process, utilizing the aqueous condensate of the side-cut vapors to wash the extract and raffinate streams for the removal of solvent therefrom. Still another object of the invention is to eliminate the necessity for separately distilling the aqueous condensate of the side-cut stripper vapors to recover an aqueous condensate substantially free of solvent.

In one of its embodiments the present invention relates to an improvement in the solvent extraction of an aromatic hydrocarbon from a hydrocarbon mixture containing aromatic and paraffinic hydrocarbons wherein said mixture is countercurrently contacted at extraction conditions with a solvent composition which selectively dissolves the aromatic component of said mixture, separating the resulting raffinate comprising the non-extracted paraffinic components of said mixture from a rich solvent comprising said aromatic hydrocarbon dissolved in said solvent composition, thereafter distilling said rich solvent and recovering an overhead distillate comprising the more volatile portion of said aromatic component, and a separate higher boiling fraction from said rich solvent, the hydrocarbon portion of which is essentially pure aromatic extract, the improvement in said process which comprises rectifying the vapors of said higher boiling fraction in a separate distillation zone, recovering substantially solvent-free water from the overhead vapors of the rectifying step, and washing said raffinate and extract streams with said solvent-free water to thereby remove solvent dissolved in said streams.

In the solvent extraction of aromatic hydrocarbons from mixed hydrocarbon feed stocks utilizing a solvent selectively miscible with the aromatic component, the solvents utilized for this purpose generally contain a certain proportion of water in order to increase the selectivity of the solvent for the aromatic component of the feed stock and to increase the capacity of the solvent to reject the non-aromatic feed stock components which accumulate and are removed from the extraction process as the so-called "raffinate" stream therefrom. By the inclusion of water in the solvent composition, the solubility of aromatic hydrocarbons in the solvent, although somewhat reduced in comparison with a non-aqueous solvent, greatly decreases the solubility of raffinate components in the solvent and also reduces the solubility of solvent in the raffinate stream. Solubility of solvent in the raffinate, however, cannot be completely eliminated and consequently, the raffinate stream inherently contains more or less solvent, depending upon the proportion of water in the solvent composition. Although the quantity of solvent in the raffinate at any instant is relatively small, the cumulative effect of such small amounts of solvent in a stream removed from the process flow and thus otherwise lost, greatly reduces the efficiency and economy of the solvent extraction process. Accordingly, it is essential that the solvent dissolved in the raffinate stream be recovered therefrom. Such recovery can be accomplished efficiently by countercurrently washing the raffinate with water in a separate washing zone from which an aqueous wash effluent is recovered containing dissolved therein the solvent recovered from the raffinate.

Although the aqueous solvent composition selectively extracts the aromatic components from the hydrocarbon feed stock, it nevertheless dissolves a small but significant quantity of raffinate components having essentially the same boiling point as the aromatic extract hydrocarbon. If these are not removed from the rich solvent prior to the recovery of the aromatic component therefrom in the stripping stage, dissolved raffinate components tend to distill from the rich solvent with the aromatic product, and since these hydrocarbons have essentially the same boiling point as the desired aromatic extract, they are not readily removed from the aromatic product by distillation. When the aromatic product is desired in a high state of purity, as, for example, in the production of benzene of at least nitration grade quality, containing 99+ percent benzene, a slight contamination of the aromatic product with raffinate produces a nonacceptable product which generally cannot be readily purified by supplementary methods of purification. In accordance with the preferred method of operating the present solvent extraction process, the rich solvent stream is contacted (preferably under countercurrent flow conditions), prior to the recovery of the aromatic extract therefrom in the stripping stage, with a light paraffin-aromatic mixture recovered as overhead from the rich solvent stripping column. During such countercurrent contact of the rich solevent with the light paraffin-aromatic reflux, the feed stock raffinate dissolved in the solvent is displaced from the rich solvent prior to its removal from the solvent extraction zone, being replaced by the light paraffin and aromatic components of the reflux. The rich solvent leaving the solvent extraction zone, thereby, contains dissolved aromatic extract and light paraffin present therein by virtue of the contact between the light paraffin-aromatic reflux and rich solvent stream in the lower portion of the solvent extraction zone. In the subsequent stripping section of the process in which the hydrocarbon solute is stripped from the rich solvent with the aid of steam formed by distillation of the aqueous solvent composition and/or by the injection of water (for example, aqueous wash effluent) into the stripping zone which is maintained at a temperature above the boiling point of the solvent, the relatively volatile overhead from the stripping zone contains substantially all of the light paraffins in the reflux as well as a portion of the most volatile aromatic component of the rich solvent stream. Prior to recycle of the light overhead to the extraction zone for reflux purposes, however, advantage is taken of the aromatic component present in the overhead to displace the raffinate paraffin dissolved in the aqueous wash effluent recovered from the raffinate water-washing step, which is thereafter charged into the rich solvent stripping zone as a source of stripping steam therein. Such additional processing techniques will be hereinafter further described.

Typical hydrocarbon mixtures containing aromatic components and utilizable as feed stocks to the present process include certain distillate fractions (usually boiling within the gasoline boiling range) of natural gasoline or straight-run petroleum distillates, and especially, hydroreformed naphthas which are generally relatively rich in aromatic hydrocarbons and are particularly valuable as a source of such mononuclear aromatic hydrocarbons as benzene, toluene and xylene.

Suitable solvent compositions which have a preferential solubility for aromatic hydrocarbons are generally selected from certain classes of organic compounds containing, in general, at least one molar substituent selected from such radicals as hydroxyl, amino, cyano, carboxyl or nitro radicals. In order to be effective in a system of extraction such as the process provided by the present invention, the solvent component having the polar radical must have a boiling point substantially greater than the boiling point of water which is added to the solvent composition for enhancing its selectivity, and in general, must also have a boiling point substantially greater than the end boiling point of the hydrocarbon feed stock. In most instances the solvent composition has a greater density than the hydrocarbon feed stock and is accordingly introduced into the uppermost portion of the solvent extraction zone, thereafter flowing downwardly, countercurrent to the rising hydrocarbon feed stock introduced into the extraction zone at its mid-point or in the lower portion thereof.

Organic compounds suitable as the solvent component of the solvent composition may be selected from the relatively large group of compounds characterized generally as oxygen-containing compounds, particularly the aliphatic and cyclic alcohols, the glycols and glycol ethers, as well as the glycol esters and glycol ether-esters. The mono- and polyalkylene glycols in which the alkylene group contains from 2 to 3 carbon atoms, such as ethylene glycol, diethylene glycol, triethylene glycol and tetraethylene glycol, propylene glycol, dipropylene glycol, and tripropylene glycol, as well as the methyl, ethyl, propyl and butyl ethers of the glycol hydroxyl groups and the acetic acid esters thereof constitute a particularly preferred class of organic solvents useful in admixture with water as the solvent composition of the present process. Various phenols such as phenol and resorcinol and their alkyl ethers, such as para-cresol, thymol, etc., are also effective solvents for aromatic hydrocarbons. Certain aliphatic nitriles, cyano-substituted ethers and amines, such as acetonitrile, the di-alpha, di-beta, and di-gamma, propionitriles and the diethers and polyalkylene polyamines constitute another group of useful solvents when combined with water in certain proportions to provide solvent compositions having the desired selectivity. The preferred polyalkylene glycols and especially diethylene, triethylene and dipropylene glycols, containing from 2 percent to about 25 percent by weight of water, constitute especially desirable solvent compositions for use in the present process.

The improvement in the basic solvent extraction process to which the present invention is directed involves the rectification or fractional condensation of the side-cut vapors removed from the rich solvent stripping column in a separate side-cut rectification column in order to produce an overhead distillate from the side-cut rectification column consisting essentially of pure water which is thereafter utilized for washing the extract and raffinate streams recovered from the solvent extraction process. In this manner, the heat present in the side-cut vapors is utilized in the still to provide for the vaporization of the overhead water distillate, leaving a residue of relatively non-volatile solvent and extract hydrocarbon, both of which are present in the side-cut vapors carried over to the water rectifying column. In this manner the aqueous phase recovered from the side-cut vapors is recovered in a form substantially free of solvent, a form in which it is effective as a wash stream to remove solvent from the extract and raffinate product streams of the process. The foregoing proceduce comprising the present improvement of the basic process flow is contrasted with the methods heretofore utilized in the prior art to accomplish solvent removal treatment by the substantial savings in the amount of heating and cooling facilities required by the process for effecting the desired recovery of solvent-free extract and raffinate products, as well as a substantial savings in the initial investment for equipment. The heat consumed by the solvent extraction-rich solvent stripping process incorporating the present improvement is from 25 to 35 percent less than the heat requirements of the former system of the prior art utilizing an otherwise essentially similar system of recovery and at the same rate of extract production. Thus, the present improvement eliminates the condensation of the side-cut vapors to a liquid stream as formerly practiced, followed thereafter by redistillation of the aqueous condensate phase to produce an overhead free of solvent for purposes of washing the raffinate and extract streams with water free of glycol. The present method accomplishes the foregoing results in a single distillation column with no greater expenditure of heat than is required for operation of the column and separation of the desired products.

The present invention and particularly the improvements in the process of solvent extraction effected by application of the present invention will be explained in greater detail in connection with the accompanying diagram which illustrates a typical process flow for effecting solvent extraction of an aromatic-containing hydrocarbon mixture with a solvent composition having the foregoing characteristics. In thus describing a typical application of the present improvement, however, as directed to a specific solvent and specific process conditions, it is not thereby intended to limit the generally broad scope of the invention necessarily to the process arrangement described in the diagram.

Referring to the accompanying diagram, an aromatic hydrocarbon-containing feed stock, such as the product of a gasoline reforming process containing benzene, toluene and one or more xylenes as aromatic components, is charged into the process flow through line 2 at a superatmospheric pressure sufficient to maintain the charge stock in substantially liquid phase at the particular temperature maintained within the extraction zone, for example, at pressures of from about 10 to about 300 pounds per square inch or higher. Depending upon the water content of the solvent composition, the temperature of the extraction may be varied to increase or decrease the selectivity and solubility relationships between the solvent and the hydrocarbon feed stock. Utilizing a polyalkylene glycol solvent, for example, containing from 2 to about 25 percent by weight of water, the process may be operated at temperatures of from about 100° to about 300° C. In order to increase the solubility of aromatics in the solvent, while maintaining the selectivity at a high level, the extraction stage of the process is more preferably operated at a relatively elevated temperature, preferably within the range of from about 125° to about 200° C., maintaining a superatmospheric pressure on the system sufficient to provide essentially liquid phase conditions, if necessary. For polyethylene glycol solvents, such as triethylene glycol, containing from 5 to about 15 percent by weight of water, the preferred extraction conditions for the present process are temperatures of from about 110° to about 150° C., utilizing solvent to feed stock ratios of from about 5 to 1 to about 15 to 1 volumes per volume.

Referring again to the accompanying diagram, the feed stock at the foregoing temperature and pressure conditions is charged into countercurrent solvent extraction column 1 through line 2, being charged at a point below the solvent inlet, generally into the upper portion of the column, above the rich solvent outlet in the lowermost portion of the column. Lean solvent composition from which hydrocarbon solute has been removed in the stripping stage of the process, as hereinafter described, is charged into the upper portion of solvent extraction zone 1 through line 3, being charged into the column at the desired temperature and pressure conditions provided by means hereinafter described.

Solvent extraction zone 1 may be of any type suitable for effecting countercurrent contact between two liquid phases at least partially miscible in each other and wherein the relatively more dense solvent may be brought into intimate contact with the relatively less dense hydrocarbon phase. Thus, extraction zone 1 may be a packed column or may contain a series of horizontal, perforated plates through which the liquid solvent flows in dispersed form and in countercurrent flow relationship to an ascending hydrocarbon stream. The recycle reflux stream comprising predominantly the lightest aromatic extract component present in the feed stock such as the stream recovered as overhead from the solvent stripping zone, hereinafter described, and which is utilized in the present process for countercurrently washing the rich solvent stream in the lower portion of the extraction zone to displace raffinate solute from the rich solvent prior to removal of the latter from the extraction zone is charged into zone 1 below the feed inlet point through line 4, being supplied at least in part from recycle sources hereinafter described.

As the feed stock and reflux flows upwardly through column 1 in countercurrent relationship to the descending solvent composition at the solvent extraction conditions maintained in zone 1, the solvent selectively extracts the more soluble aromatic hydrocarbon components of the feed stock and selectively rejects the paraffinic and other non-aromatic components which make up the raffinate. A non-extracted residue, herein referred to as "raffinate," comprising predominantly paraffinic hydrocarbons substantially free of the aromatic hydrocarbons to be recovered as extract product of the process, is withdrawn from the top of extraction zone 1 through line 5, which discharges the raffinate stream into raffinate washing zone 6 for recovery of the normally small but significant quantity of solvent composition dissolved in the effluent raffinate hydrocarbon stream. Since this stream is customarily employed for blending into gasoline motor fuels, the presence of the solvent therein is detrimental to its use and must accordingly be removed therefrom prior to its use as a motor fuel. In addition to the foregoing basis for removal of the dissolved solvent from the raffinate and even though the quantity of solvent dissolved in the raffinate effluent is generally small, if not recovered therefrom, its continuous removal from the process in the raffinate would represent a substantial loss of solvent composition on a continuously operating basis, since the raffinate stream does not re-enter the process flow. Accordingly, raffinate washing zone 6 is incorporated into the process flow in order to recover the solvent composition removed from the extraction zone in the raffinate.

In order to effect such recovery of solvent from the raffinate on an efficient and effective basis, however, the source of aqueous stream used to wash the raffinate must be free of solvent composition and must be confined to the smallest possible quantity sufficient for the purpose, since excess water must be removed from the recovered solvent solution when the aqueous wash stream is recycled to the extraction zone to reintroduce the solvent into the system. The most effective source of aqueous wash stream for this purpose is that recovered as vapor side-cut of the stripping column when operated in accordance with the present process which produces a substantially pure water stream containing no dissolved solvent therein and which when reintroduced into the recycle lean solvent in the amount corresponding to the water recovered from the stripper side-cut and overhead vapors restores the solvent composition to its predetermined water content. The source of the solvent-free water utilized in the present process to wash not only the raffinate stream but also the extract stream will hereinafter be referred to in greater detail.

As the rich solvent stream containing dissolved aromatic extract flows downwardly through extraction zone 1, it countercurrently contacts the light aromatic reflux introduced into the lower portion of extraction zone 1 through line 4, which conveys the light hydrocarbons from their point of origin as the hydrocarbon component of the light overhead from the rich solvent stripping zone, hereinafter described. As the reflux flows into the lower portion of zone 1, it countercurrently contacts the rich solvent as the latter descends through the extraction zone and displaces raffinate paraffins which have a tendency to dissolve in the rich solvent stream to a small extent, thereby, in effect, countercurrently washing the rich solvent prior to its removal from the extraction zone with light, more soluble aromatics which replace the raffinate solute from the rich solvent into the upwardly flowing hydrocarbon phase, ultimately comprising the raffinate effluent from the extraction zone. The resulting rich solvent containing dissolved aromatic extract and from which raffinate hydrocarbons boiling in the same range as the aromatic solute have been replaced by the reflux is removed from the bottom of extraction zone 1, through line 7, and transferred by means of pump 8 through line 9, and at a rate controlled by valve 10, into the upper portion of stripping zone 11, for the recovery of hydrocarbon solute therefrom. Stripping zone 11, generally contains a reboiler, such as 12, in the lower portion of the column which supplies additional heat to the rich solvent residue for stripping the last traces of aromatic solute from the rich solvent prior to its removal from the stripping zone.

In the preferred manner of operating the present extraction process, zone 1 is maintained at a temperature above the boiling point of the rich solvent and at a pressure sufficient to maintain the rich solvent substantially in liquid phase at the particular extraction temperature. Thereafter, the resulting rich solvent, in essentially liquid phase, is transferred into stripping zone 11, wherein the pressure on the rich solvent is reduced (preferably in several stages), while maintaining substantially the same temperature in the zone by means of reboiler 12. Hydrocarbon solute, particularly the light aromatic components thereof, are flashed from the rich solvent at the resulting substantially isothermal stripping conditions. The composition of the vapor overhead is predominantly a mixture of the light paraffins and the light aromatics together with a small amount of solvent and water vaporized from the rich solvent, the proportion of the latter components increasing as the boiling points of the respective overhead and side-cut vapors increase.

The overhead flashed from the rich solvent contains substantially all of the light paraffins contained in the reflux stream dissolved in the rich solvent, together with a portion of the lowest boiling aromatic solute component which distills overhead with the light paraffin during the stripping operation. In any event, the reduction in pressure between the extraction and stripping column is sufficient to vaporize almost completely the paraffinic component of the rich solvent stream and if necessary, sufficient heat is introduced into the reboiling section of the column to supply the heat of vaporization required to completely remove all of the paraffin from the rich solvent into the vapor overhead and to effect such vaporization on a substantially isothermal basis. Vapor overhead is removed from the top of the stripping column through line 13, into overhead condenser 14, which liquefies the vaporized components for withdrawal therefrom through line 15 and discharge into overhead receiver 16.

The upper hydrocarbon layer accumulating in receiver vessel 16, comprising a mixture of the light paraffins distilled from the rich solvent and a large proportion of the lightest aromatic component of the feed stock dissolved in the rich solvent is withdrawn through line 4, from the top of receiver vessel 16, through valve 17 and recycled for reuse in the lower portion of extraction zone 1, as the aforementioned recycle reflux. The aromatic component present in the reflux stream, recovered therefrom in extraction zone 1, increases as the amount of reflux recycled to the extraction zone increases, forcing greater proportions of the lightest aromatic into the higher boiling fraction separated from the stripping zone as side-cut, thereby ultimately recovering all of the light aromatic component present in the feed stock as a portion of the extract product.

The lower aqueous phase containing solvent dissolved therein and stripped from the rich solvent in the stripping zone, also contains dissolved light aromatic component, the aqueous and hydrocarbon phases separating as distinct layers in the overhead condensate receiver. Another stream which enters the overhead condensate receiver is the aqueous wash effluent recovered from the raffinate washing columns, as hereinafter described. The wash effluent, after contacting the raffinate to recover solvent dissolved therein, contains a small amount of raffinate, which if introduced into the stripping column, would contaminate the extract product with paraffins boiling in the same boiling range as the aromatic extract and normally not recoverable therefrom. In accordance with one feature of the present process, the aqueous wash effluent is mixed with the contents of the overhead receiver where the light aromatics present in the receiver vessel displace the raffinate from the wash effluent and replace the dissolved raffinate with aromatic extract, the displaced raffinate mixing mixing with the reflux layer recycled to the extraction zone. The lower aqueous layer in the receiver vessel, now containing dissolved aromatic extract instead of raffinate may be charged into the reboiling section of the stripping column, producing steam and recovering the solvent therein.

The aqueous phase accumulating in the settling leg of receiver vessel 16 is drained therefrom through line 18, into water receiver vessel 19, which accumulates the water for subsequent use in the washing stage of the process, as hereinafter indicated. Water accumulating in water receiver vessel 19 and containing dissolved solvent recovered from the various water washing and stripping stages of the present process is withdrawn, as required, through line 20, and valve 21, and preferably charged into heat exchanger 22, in which the water is converted at least partially into superheated steam which together with the solvent is injected through line 23, into the reboiling section of stripping zone 11. Alternatively, the water in vessel 19 may be charged directly into the reboiling section, in which case the duty on reboiler 12 is greater. The steam thereby generated in the bottom of the stripping zone is injected into the rich solvent residue, stripping the residual hydrocarbons remaining in the rich solvent therefrom and rehydrating the solvent to the level of water content required for the solvent composition for recycling to extraction zone 1. Thus, the solvent contained in the various sources of aqueous streams in the process is reintroduced into the lean solvent composition, thereby recovering the solvent for reuse in the process. Heating fluid for use in heat exchanger 22 is introduced through line 25, and withdrawn through line 24.

The lean solvent composition from which the hydrocarbon solute has been completely stripped and which has been rehydrated to the water content required for use in the extraction zone is withdrawn from the bottom of stripping zone 11, through line 26, at a rate controlled by valve 27, and transferred by means of pump 28, through line 3, into the top of extraction zone 1 for reuse in the solvent extraction system. Any solvent required for make-up, due to losses in the system, is charged into line 3, from storage, through line 29, at the rate required by the process.

A higher boiling vapor side-cut consisting of substantially all of the aromatic extract hydrocarbons present in the rich solvent stream, except for the light aromatic removed in the vapor overhead (ultimately recovered in the side-cut vapor) and free of all paraffinic raffinate is withdrawn from column 11, as a side-cut vapor through line 30, and valve 31. In accordance with the invention herein provided these side-cut vapors are discharged into water rectifying column 32, wherein the heat contained in the side-cut vapors is utilized to distill a substantially pure water overhead from the rectifying column, the rectifier overhead condensate being utilized as the source of wash water in the raffinate and extract washing columns.

Water rectifier 32 is a fractional distillation column containing side-to-side pans, bubble deck plates or a packing material, such as quartz chips, wherein contact between vapor and liquid phases may be obtained and thereby fractionation realized. Although ordinarily the latent and sensible heat content of the vapors entering water rectifier 32 provide sufficient heat for fractionation purposes in column 32, in the event that only light aromatics are present in the side-cut vapor, a reboiler may be required into which additional heat may be introduced into column 32 to effect distillation of the overhead vapors. Such reboiler, although generally not required for rectification of water from heavy aromatic extracts, is indicated on the enclosed diagram as reboiler 33, if required for rectification purposes.

Accompanying the water and hydrocarbon extract portions of the side-cut vapor is a small but significant proportion of solvent which, even though relatively non-volatile, has sufficient vapor pressure at the distillation temperature, as well as entrainment due to foaming, to accompany the water and hydrocarbon in the side-cut vapors. During the distillation of the side-cut vapors in water rectifier 32, the higher boiling components of the vapor, such as aqueous solvent and extract, condense and a major proportion of the water present in the side-cut vapors distills overhead through line 34, into condenser 35, the resulting liquid condensate flowing through line 36, into receiver vessel 37.

The rectifier bottoms or residue remaining in column 32 after vaporization of water and light aromatics therefrom as overhead, is predominantly a more concentrated aqueous solution of the solvent and aromatic extract, particularly the higher boiling components of the aromatic hydrocarbons recovered from the feed stock. This residue is withdrawn from column 32 through line 38, at a rate controlled by valve 39, and discharged from line 38 into the bottom of extract washing column 40, wherein the solvent dissolved in the extract product is washed therefrom by means of a countercurrent stream of the water recovered as overhead from rectifier 32, introduced into the top of the column, as hereinafter described.

The overhead distillate from column 32, which collects as liquid phase in receiver vessel 37, separates on standing into two layers, an upper hydrocarbon layer consisting of light aromatic extract which is withdrawn from the top of receiver vessel 37 through line 41 and refluxed back to the rectifying column. A portion of the hydrocarbon stream may be withdrawn through line 42 and valve 43 as a net product if it is necessary to raise the hydrocarbon partial pressure at the top of the column to take over more water. The mixed aromatics extract product is thereafter conveyed by line 38 into the top of water washing column 40, where solvent in column 32 bottoms and solvent dissolved in the extract is recovered by means of a countercurrent wash with the substantially pure water overhead of rectifier 32.

The lower layer accumulating in receiver vessel 37, less than 1.5 percent by weight of impurities. The recovery of aromatic product is 98.6 percent of the aromatics initially present in the hydrocarbon feed stock charged to the process.

The aqueous layer drained as the bottom layer of the side-cut receiver vessel contains 2.65 percent by weight of diethylene glycol solvent distilled with the hydrocarbons and water in the side-cut vapor fraction. This aqueous condensate is charged into a secondary distillation column containing about 5 plates and heated in the lower portion thereof with a reboiler for distillation of the water from the aqueous mixture. The overhead, when separately condensed and collected is utilized as a source of water for washing the extract and raffinate streams, as aforesaid. The condensed overhead is substantially pure water containing only slight traces of diethylene glycol solvent.

In the following run B the aforementioned solvent extraction process is operated at the same solvent to feed stock charging rate, in the same equipment and in general the same procedure is utilized to effect the recovery of the desired aromatic extract, except that the side-cut vapors withdrawn from the stripping column are charged directly into a water rectifying column containing "Fri Dualflow" trays and having about 3 theoretical plates. In most cases no additional heat is required by the secondary distillation column to rectify the stripper side-cut vapors charged into the column. An overhead vapor is withdrawn from the top of the column and passed into a water-cooled condenser from which the condensate is collected and stored in a receiver vessel. An upper hydrocarbon layer consisting of light aromatics is refluxed to the top plate of the side-cut rectifier. The lower aqueous layer in the receiver, consisting essentially of water containing only traces of diethylene glycol solvent, is withdrawn from the receiver vessel as lower layer at the rate of 1839 gallons per hour and charged in part into the top of the raffinate and extract water wash columns for use therein as the source of water for the removal of glycol from these hydrocarbons. 250 gallons per hour of the rectifier overhead condensate is charged into the top of the raffinate washing column and 230 gallons per hour is charged into the top of the extract water washing column. The raffinate removed from the top of the raffinate wash column contains about 2 p.p.m. of glycol and the extract removed from the top of the extract water wash column contains less than 1 p.p.m. of ethylene glycol solvent. The aqueous washings recovered as bottoms of the extract and raffinate water wash columns are diverted into the water receiver vessel and mixed with the aqueous condensate of the overhead distillate from the stripper and the remainder of the side-cut rectifier condensate, the entire mixture being thereafter charged into a heat exchanger which generates steam for introduction into the stripping zone of the rich solvent stripping column.

Utilizing the latter method of rectifying the side-cut vapors from the stripping stage of the process (that is, run B) the total heat required to operate the process is reduced by 28 percent and the quantity of cooling water for operating the condensers is reduced by a like amount.

We claim as our invention:

1. A solvent extraction process which comprises contacting a hydrocarbon mixture containing aromatic and paraffinic hydrocarbons at extraction conditions with a water-containing solvent composition which selectively dissolves the aromatic component of said mixture, separating the resulting raffinate comprising the non-extracted paraffinic component of said mixture from a rich solvent comprising aromatic hydrocarbons dissolved in said solvent composition, thereafter distilling said rich solvent and recovering a primary overhead distillate comprising vaporized light aromatic component, removing from the distilling step a side-cut of higher boiling point than said distillate and comprising aromatic hydrocarbon and aqueous solvent, rectifying the withdrawn side-cut in a separate rectifying zone to separate therefrom an aromatic extract and a substantially solvent-free aqueous condensate, washing said raffinate and extract with separate portions of said aqueous condensate, recovering the resultant aqueous wash effluents and mixing the raffinate wash effluent with said primary overhead distillate.

2. The process of claim 1 further characterized in that said solvent composition comprises a polyalkylene glycol containing from 2 to 3 carbon atoms in the alkylene group.

3. The process of claim 2 further characterized in that said polyalkylene glycol is diethylene glycol.

4. The process of claim 2 further characterized in that said solvent composition comprises triethylene glycol.

5. The process of claim 1 further characterized in that said aromatic extract is a mixture of aromatic hydrocarbons comprising benzene, toluene and $C_8$ aromatic hydrocarbons.

6. The process of claim 1 further characterized in that said aromatic extract is a mixture of aromatic hydrocarbons containing from 6 to 11 carbon atoms.

7. A solvent extraction process which comprises contacting a hydrocarbon mixture containing aromatic and paraffinic hydrocarbons at extraction conditions with a water-containing solvent composition which selectively dissolves the aromatic component of said mixture, separating the resulting raffinate comprising the non-extracted paraffinic component of said mixture from the rich solvent comprising an aromatic hydrocarbon dissolved in said solvent composition, thereafter distilling said rich solvent and recovering a primary overhead distillate comprising vaporized aromatic component and water, removing from the distilling step a side-cut of higher boiling point comprising aromatic hydrocarbon and water vapor, separating said water vapor from the aromatic portion of said side-cut and condensing the same, washing said raffinate with the resultant water condensate, recovering a resulting aqueous wash effluent and mixing said effluent with said primary overhead distillate.

8. The process of claim 7 further characterized in that the aqueous phase recovered from mixing the primary overhead distillate with said raffinate wash effluent is charged into the reboiling section of the distilling step as a source of stripping steam in the primary distillation step.

References Cited by the Examiner
UNITED STATES PATENTS

| | | | |
|---|---|---|---|
| 2,770,663 | 11/56 | Grote | 260—674 |
| 2,773,918 | 12/56 | Stephens | 260—674 |
| 2,878,261 | 3/59 | Broughton | 260—674 |
| 2,904,508 | 9/59 | Hughes et al. | 208—311 |
| 2,915,569 | 12/59 | Hutchings | 260—674 |
| 2,936,283 | 5/60 | Hutchings | 208—321 |
| 3,037,062 | 5/62 | Gerhold | 260—674 |

ALPHONSO D. SULLIVAN, *Primary Examiner.*